(12) United States Patent
Herrick

(10) Patent No.: US 8,061,075 B2
(45) Date of Patent: Nov. 22, 2011

(54) POTTED FISHING JIG

(76) Inventor: Michael F. Herrick, Plymouth, MN (US)

( * ) Notice: Subject to any disclaimer, the term of this patent is extended or adjusted under 35 U.S.C. 154(b) by 1466 days.

(21) Appl. No.: 11/121,396

(22) Filed: May 3, 2005

(65) Prior Publication Data
US 2006/0185217 A1 Aug. 24, 2006

Related U.S. Application Data

(60) Provisional application No. 60/655,263, filed on Feb. 21, 2005.

(51) Int. Cl.
*A01K 85/00* (2006.01)
(52) U.S. Cl. ........................................................ 43/17.6
(58) Field of Classification Search .................... 43/17.6
See application file for complete search history.

(56) References Cited

U.S. PATENT DOCUMENTS

| 757,077 | A | 4/1904 | Whipple |
| 1,079,891 | A | 11/1913 | Simms |
| 2,711,044 | A | 6/1955 | Woods |
| 3,040,462 | A | 6/1962 | Guida |
| 3,940,868 | A | 3/1976 | Northcutt |
| 4,085,538 | A | 4/1978 | Jankowski |
| 4,227,331 | A | 10/1980 | Ursrey et al. |
| 4,763,433 | A | 8/1988 | Kulak |
| 5,157,857 | A * | 10/1992 | Livingston ..................... 43/17.6 |
| 5,195,266 | A * | 3/1993 | Troescher ..................... 43/17.6 |
| 5,330,282 | A | 7/1994 | Rodgers |
| 5,495,690 | A * | 3/1996 | Hunt ............................. 43/17.6 |
| 5,697,182 | A * | 12/1997 | Rodgers ......................... 43/17.1 |
| 5,962,142 | A | 10/1999 | Tachi et al. |
| 6,336,288 | B1 * | 1/2002 | Foss ............................... 43/17.6 |
| 6,546,666 | B2 | 4/2003 | Schultz et al. |
| 6,581,319 | B2 * | 6/2003 | West ............................. 43/26.2 |
| 2003/0182841 | A1 | 10/2003 | Calak, Jr. et al. |
| 2006/0096152 | A1 * | 5/2006 | Pelegrin ......................... 43/17.6 |

FOREIGN PATENT DOCUMENTS

JP 2000-201578 A 7/2000

* cited by examiner

*Primary Examiner* — K. Smith

(57) ABSTRACT

The present fishing jig is potted, battery powered, water activated, and light emitting. A jig is a kind of lure that is essentially a bare hook. A jig is a hook having two ends, with a barb located at one end and with a relatively small body, such as a small plastic ball, located at the other end near the eyelet. Components of the present jig are potted in plastic such that the jig is sealed against entry of water, such that seam breakage need not be a concern, and such that the jig can be dropped without internal components being jarred from their positions. The battery of the jig is a relatively small calculator, watch, coin cell, or button battery. Water activation occurs via exposed electrical leads such that the light emitting diode is activated only when the lure is immersed in water. The fish attracting light emitting diode, like a worm, confronts the barb of the hook such that fish striking the light source also likely strike the barb of the hook. A stick-on potted strip having a water-activated light source is further disclosed.

27 Claims, 11 Drawing Sheets

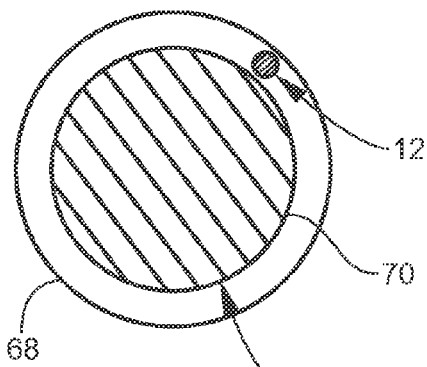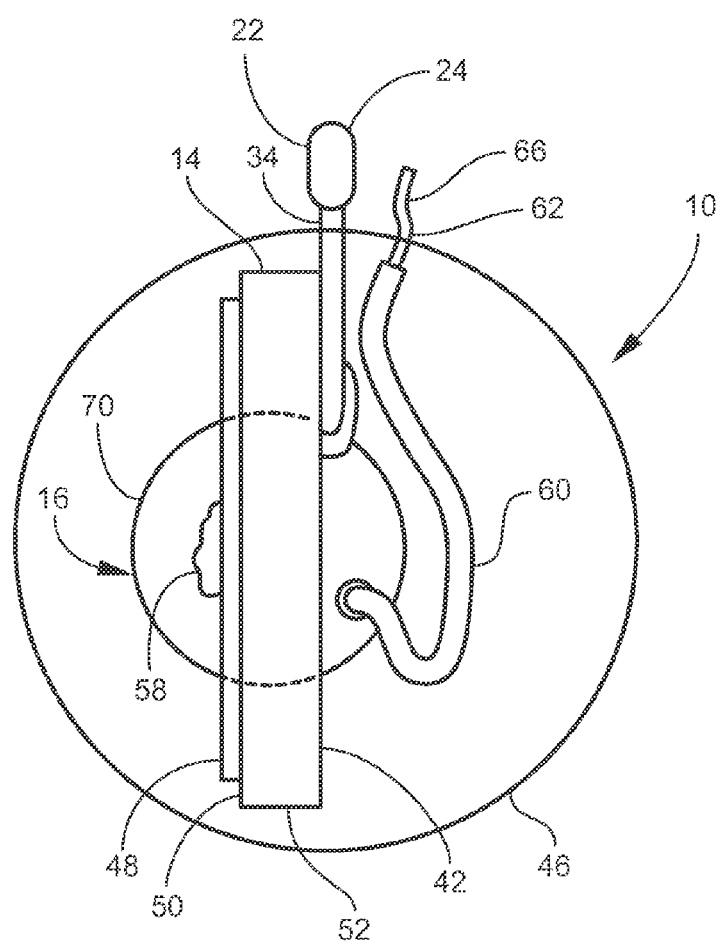

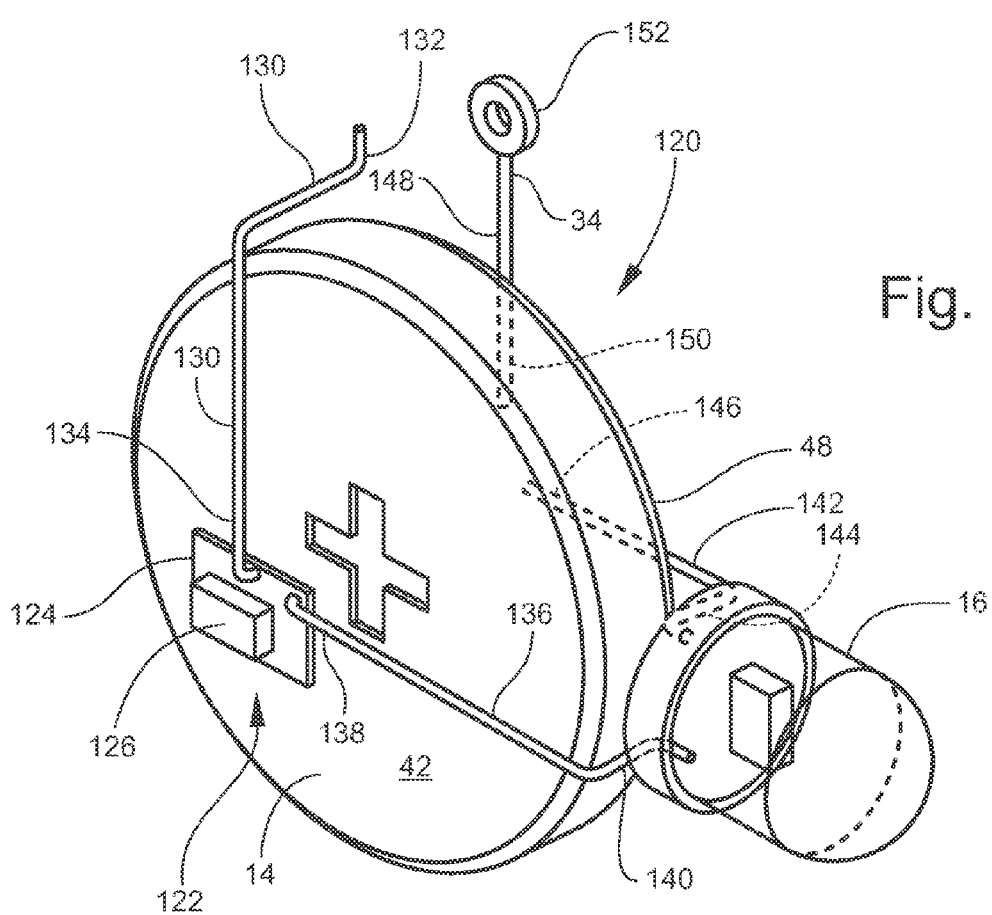

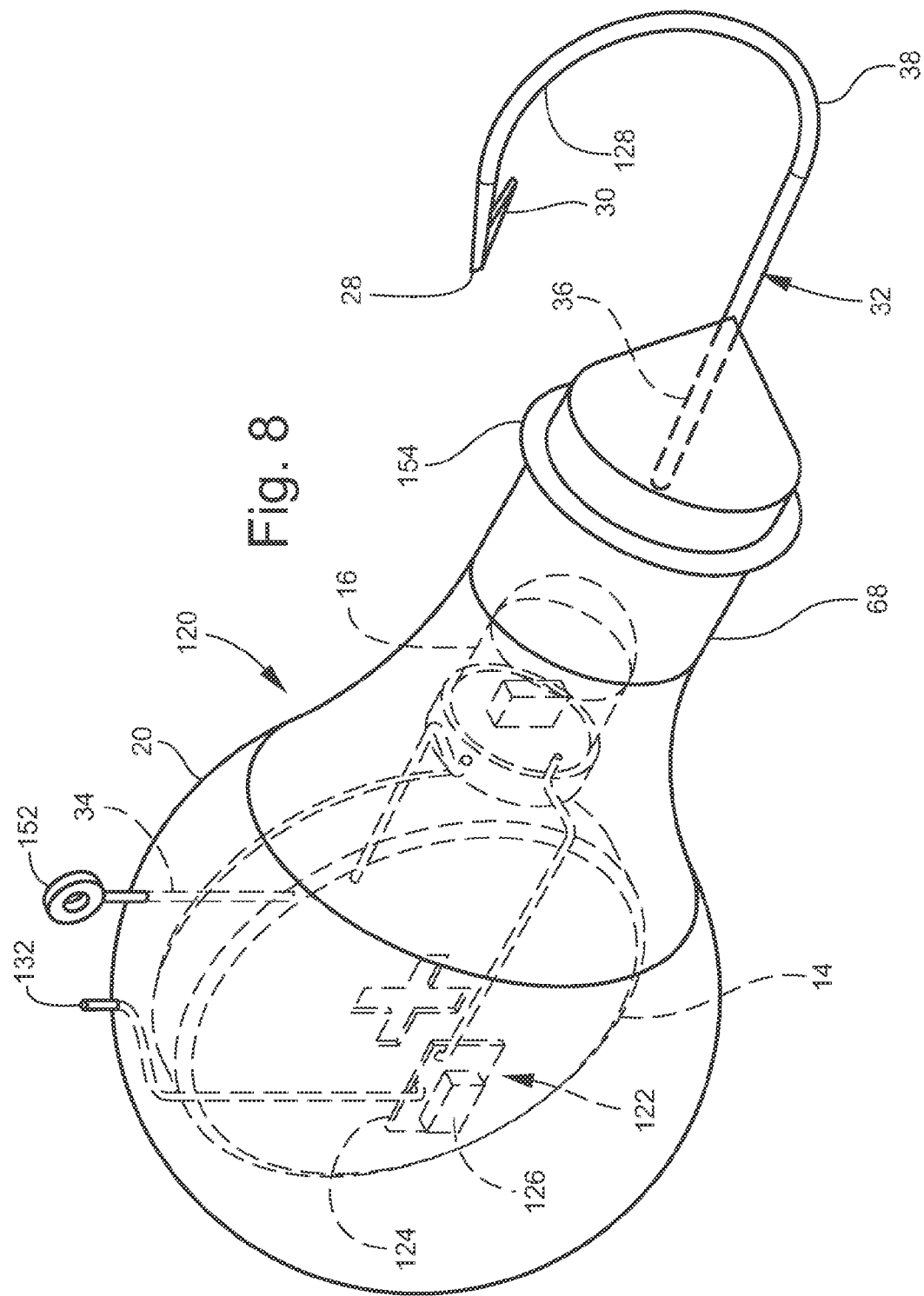

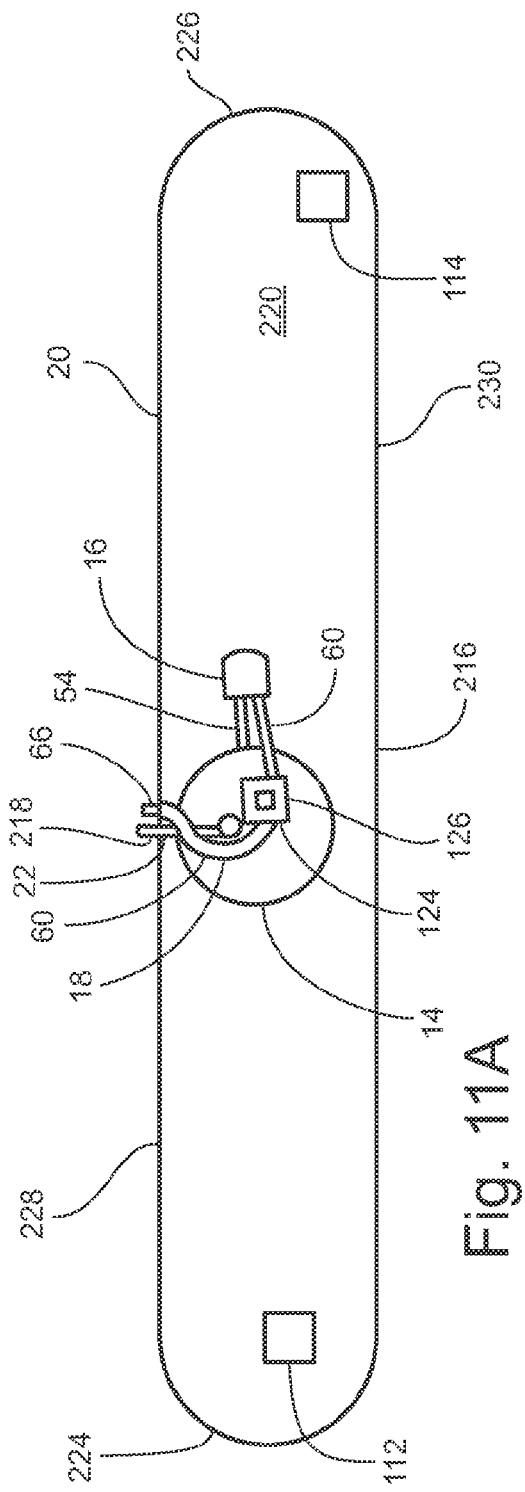
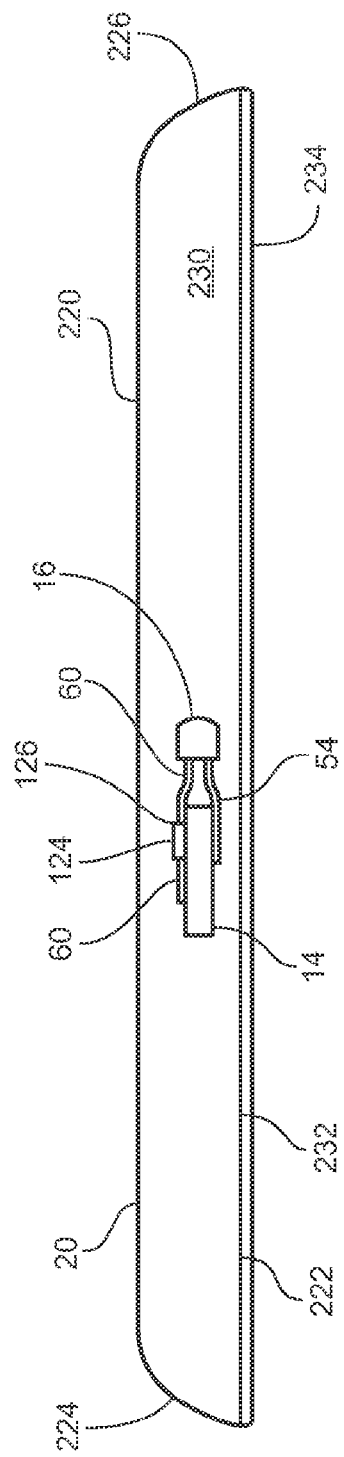

POTTED FISHING JIG

This application claims the benefit under 35 U.S.C. 119(e) of U.S. Provisional Patent Application No. 60/655,263 filed Feb. 21, 2005, which is hereby incorporated by reference in its entirety into this application.

FIELD OF THE INVENTION

The present invention relates generally to a fishing jig, particularly to a potted fishing jig, and specifically to a water-activated fishing jig having a potted battery, a potted light source, and a potted electrical lead arrangement between the battery and light source.

BACKGROUND OF THE INVENTION

A fishing jig is essentially a single hook. What a fishing jig has, and what a bare undressed hook does not have, is a ball opposite the barbed end. The ball is engaged on the hook close to the eyelet of the hook. The eyelet is used to tie the fishing jig to a fishing line.

The ball of the fishing jig may be painted to have what appears to be an eye or pair of eyes. Or the ball of the fishing jig may be of a solid bright color. Or the ball of the fishing jig may have some other exterior graphic.

In use, a worm or leech or other bait may be placed on the hook of the fishing jig. The fishing jig may then be lowered into the water, and then further lowered to the bottom of the stream or lake or other body of water, whereupon the fishing jig may be raised and lowered and then raised and lowered again and again in an attempt to attract fish. The fishing jig, not much more than a single naked hook, is slightly heavier than a single naked hook by virtue of the ball on the hook, and hence the fishing jig more readily falls by gravity to seek the bottom of the body of water where the ball more likely hits the bottom of the body of water and where the bait on the hook more likely may wiggle slightly above the bottom of the body of water.

SUMMARY OF THE INVENTION

A feature of the present invention is the provision in a fishing jig having a plastic body, of a hook, battery, light source and electrical lead arrangement at least partially potted in the plastic body.

Another feature of the present invention is the provision in a fishing jig having a plastic body with one or more components at least partially potted in the plastic body, of the hook being partially potted in the plastic body, of the battery being entirely potted in the plastic body, of the light source being entirely potted in the plastic body, and of the electrical lead arrangement being partially potted in the plastic body.

Another feature of the present invention is the provision in a fishing jig having a plastic body with one or more components at least partially potted in the plastic body, of the hook being at least partially potted in the plastic body, and of the hook being a single fishing hook having no more than one hook.

Another feature of the present invention is the provision in a fishing jig having a plastic body with one or more components at least partially potted in the plastic body, of the hook being at least partially potted in the plastic body, and of a light source potted in the plastic body and confronting the barb of the hook such that a fish striking at the light source likely confronts the barb of the hook.

Another feature of the present invention is the provision in a fishing jig having a plastic body with one or more components at least partially potted in the plastic body, of the hook being at least partially potted in the plastic body, and of the plastic body having a ball portion and with a battery being set in the ball portion.

Another feature of the present invention is the provision in a fishing jig having a plastic body with one or more components at least partially potted in the plastic body, of the hook being at least partially potted in the plastic body, and of the plastic body having a stem portion and with a light source being set in the stem portion.

Another feature of the present invention is the provision in a fishing jig having a plastic body with one or more components at least partially potted in the plastic body, of the hook being at least partially potted in the plastic body, of the hook including a curved section proximate the barb and with the curved section being disposed in generally a first plane, of the battery including a face engaged to the hook, and of the face of the battery lying in a second plane parallel to and confronting the first plane such that the fishing jig takes up a minimum of space.

Another feature of the present invention is the provision in a fishing implement, of a stick-on potted strip having a water-activated light source, where the stick-on potted strip includes a battery, and where the stick-on potted strip includes an adhesive covered by a release strip.

Another feature of the present invention is the provision in a fishing implement, of a water-activated light source in a plastic body, with the plastic body being solid up to the surfaces of hardware or internal components in the plastic body such that the plastic body is solid from end to end, from side to side, and from front to back and such that plastic of the plastic body includes no voids.

An advantage of the present invention is that it catches fish. One feature contributing to this advantage is the placement of the light source along the intermediate portion of the hook such that the light source confronts the portion of the hook having the barb, such that the light source confronts the barb of the hook and such that the light source confronts the tip of the hook, whereby a fish striking at the light source likely strikes the tip and barb of the hook. Further, a worm is placed near the tip and barb of the hook, not at the other end of the hook where the hook is tied to a fishing line via an eyelet.

Another advantage of the present invention is size. The present fishing jig can be of a relatively small size. Features contributing to a minimizing of the size of the present fishing jig are, in one embodiment, the location of the battery in the ball portion of the jig and the location of the light source in the stem portion of the jig running along an intermediate portion of the hook and, in another embodiment, the location of both of the battery and light source in the ball portion.

Another advantage of the present invention is length of operation. Since the present fishing jig is water-activated, the battery is in use only when the fishing jig is in use in a body of water.

Another advantage of the present invention is cost. The present fishing jig is relatively inexpensive to manufacture, has a shelf life limited only by the shelf life of the potted battery and incorporates relatively inexpensive components.

Another advantage of the present invention is durability. Since the components of the fishing jig are potted or at least partially potted, electrical connections remain engaged to each other even if the fishing jig is dropped on a rock and even after landing a hard fighting fish.

Another advantage of the present invention is that the present fishing jig has generally the appearance and threedimensional structure of a conventional fishing jig. That is, the present fishing jig includes a single hook, a relatively small ball or ball like portion, and an eyelet.

BRIEF DESCRIPTION OF THE DRAWINGS

FIG. 3A is a section view at lines 3A-3A of FIG. 2B showing the light source structure potted in the stem portion of the plastic body.

FIG. 3B is an end view of FIG. 2A showing the battery potted in the ball portion of the plastic body.

FIG. 7 is a perspective view of an alternate embodiment of the present fishing jig without the plastic body that pots or partially pots components of the fishing jig.

FIG. 8 is a perspective view of the fishing jig of FIG. 7 with the plastic body that pots or partially pots components of the fishing jig and shows in phantom internal components of the fishing jig.

FIG. 11A is a top view of the stick-on potted strip of FIG. 10.

FIG. 11B is a side view of the stick-on potted strip of FIG. 11A.

DESCRIPTION

Figure 1:
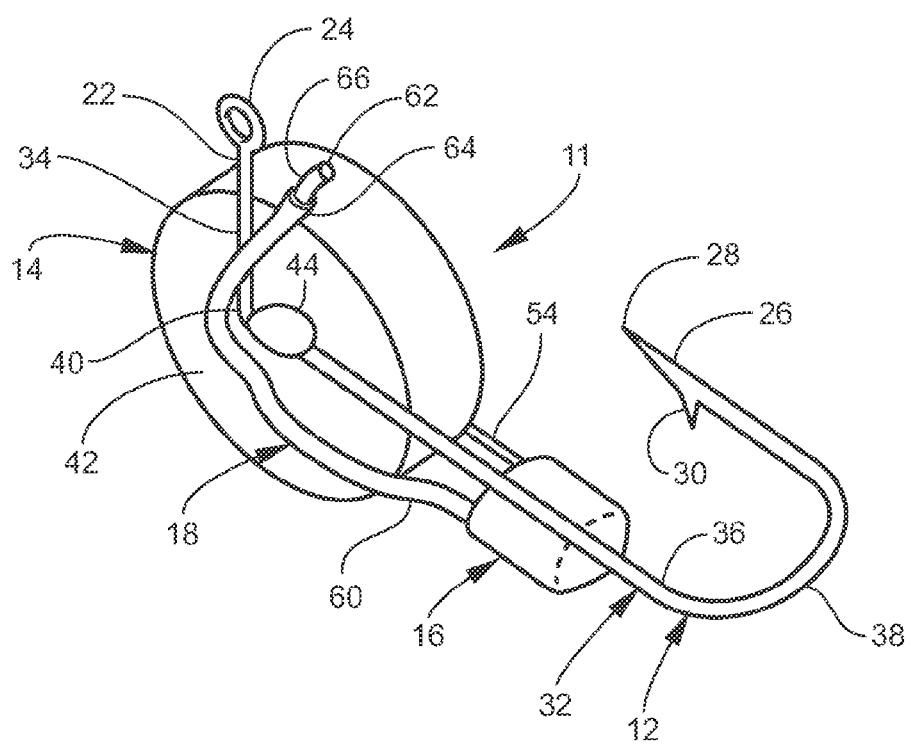
FIG. 1 is a perspective view of one embodiment of the present fishing jig without the plastic body that pots or partially pots components of the fishing jig.

As shown in FIGS. 2A, 2B, 3A, and 3B, one embodiment of the present fishing jig is indicated by the reference numeral 10. FIG. 1 shows a prefabricated form 11 of the fishing jig 10. Fishing jig 10 generally includes a hook 12, a power source 14, a light source structure or light emitting diode (LED) 16, an electrical lead or circuit arrangement 18, and a plastic body 20.

As shown in FIG. 1, hook 12 is a single hook. Hook 12 includes a first end portion 22. First end portion 22 includes an eyelet 24. A fishing line, a fishing lead line, a snap, a wire, or other device may engage eyelet 24. Hook 12 further includes a second end portion 26. Second end portion 26 includes a sharp tip 28 and a barb 30. Hook 12 further includes an intermediate portion 32 disposed between the first and second end portions 22, 26. Intermediate portion 32 includes a first generally linearly extending section 34, a second generally linearly extending section 36, and a curved hooking section 38. The first and second generally linearly extending sections 34, 36 are disposed at generally a 90 degree angle relative to each other and meet at a junction 40. Curved section 38 extends between second generally linearly extending section 36 and the second end portion 26. Hook 12 lies generally in a single plane such that curved section 38 and first generally linearly extending section 34 lie in a common plane. A length of each of the first and second generally linearly extending sections 34, 36 confronts and lies flat on a first face 42 of battery 14. Second generally linearly extending section 36 is electrically and physically engaged to the first face 42 via an adhesive connection 44, where the adhesive of the adhesive connection 44 can include a conductive component and where the adhesive can include an epoxy. A conductive adhesive maximizes electrical conduction between battery 14 and hook 12. The potting of first and second generally linearly extending sections 34, 36, or a portion thereof, against the flat face 42 of battery 14 further maximizes an engagement and conduction between battery 14 and hook 12 such that conduction can occur not only at adhesive connection 44 but also along relatively great lengths of first and second generally linearly extending portions 34, 36. The stripping of any rust protective coating that may be on first and second generally linearly extending sections 34, 36 further maximizes conduction between battery 14 and hook 12. The rust protective coating can be stripped from merely a portion about junction 40, or can be stripped from a greater portion of hook 12. Plastic of the potting can later cover the location or locations where the rust protective coating has been stripped such that hook 12 again has a coating that minimizes the formation of rust. First end portion 22 and eyelet 24 extend beyond a periphery of battery 14 and further lie beyond an exterior surface of a ball portion 46 of plastic body 20. Hook 12 is formed of a material that is relatively hard and rigid, can be sharpened, and is conductive. Hook 12 is preferably a metal hook. Of metals, steel is preferred.

Power source 14 is preferably a battery. Battery 14 is a generally in the shape of a disk. Battery 14 includes the first face 42, an annular face 50, and a second face 48 raised from the annular face 50. First face 42 is a first terminal. Second face 48 is a second terminal. Battery 14 includes a periphery or rim 52.

Battery 14 can be a watch, coin cell, or button battery. Battery 14 can consist of a single cell containing electrodes and an electrolyte that together convert chemical energy into electrical energy. Battery 14 can include a silver oxide, alkaline manganese or lithium cell such as a lithium manganese (LiMn) cell. Battery 14 is preferably a kind of battery that is substantially free of mercury, and is more preferably a kind of battery that is free of even trace amounts of mercury. All components of the present fishing jig are preferably substantially free of mercury and, more preferably, are free of even trace amounts of mercury.

Battery 14 generates between about 0.5 volts and about 5.0 volts, more preferably between about 1.5 volts and about 3.0 volts. Battery 14 weighs between about 0.05 grams and about 5.0 grams, more preferably between about 0.05 grams and about 1.5 grams. Electrical lead arrangement 18 can include an integrated circuit, such as an integrated circuit of a circuit board, such as circuit board 124 shown in FIG. 7. The integrated circuit can control whether the light source of light source structure 16 stays on continuously when fishing jig 10 is immersed in water (is steady), whether the light source of the light source structure 16 blinks, the rate of blinking of the light source such as the period between blinks and the time period of the blink itself (i.e., the amount of time that the light source stays on to generate light), any regular or irregular pattern of such blinking, the relative dimness of the light, and the relative brightness of the light. It should be noted that, with a blinking light of the present light source structure 16, the light source may emit light for ¹⁄₂₀ of a period and not emit light (be turned off) for the remaining ¹⁹⁄₂₀ of the period.

Second face or terminal 48 of battery 14 is electrically connected to the light source structure or LED 16. Light source structure 16 preferably includes, as a light source, a light emitting diode. Light emitting diodes may emit visible light or ultraviolet light. Ultraviolet light is invisible to the human eye. Ultraviolet light may be seen or somehow sensed by fish, and fish may be attracted to an ultraviolet light source. The color of the light of the light source may be any color, including blue, red, green, yellow, or white. The light emitted by the light source may be incandescent or ultraviolet (UV) light or light at bandwidths close to such.

Light source structure 16 includes a first electrical lead 54 having a distal end portion 56. Distal end portion 56 is electrically and physically engaged to the second face or terminal 48 of battery 14 via an adhesive connection 58, where the adhesive of the adhesive connection 58 can include a conductive component and where the adhesive can include an epoxy. Distal end portion 56 is electrically conductive where distal end portion 56 confronts face 48, not merely at connection 58, and distal end portion 56 is held in such confronting and electrically conducting relationship via being potted in the plastic body 20 with the battery 14.

Light source structure 16 includes a second electrical lead 60. Second electrical lead 60 includes a conductive lead portion 62 and an electrically insulative portion or jacket 64. At a distal end portion 66 of second electrical lead 60, conductive lead portion 62 is exposed relative to jacket 64 and relative to the plastic body 20 such that the distal end portion 66 of conductive lead portion 62 is exposed to the outside environment, where the outside environment can include the atmosphere or a body of water. Jacket 64 isolates the conductive lead portion 62 from the first face or terminal 42 of battery 14 and from the metal hook 12, which is also an electrical lead. Jacket 64 can terminate exactly at the outer surface of plastic body 20, slightly within the outer surface of the plastic body 20, or slightly beyond the outer surface of the plastic body 20. The length of the exposed portion 66 of conductive lead 62 is preferably sufficiently great such that the exposed portion 66 of conductive lead 62 can be bent to touch eyelet 24, and then be bent away from eyelet 24. Electrical lead 60 exits plastic body 20 preferably sufficiently close to hook end portion 22 such that the length of the exposed portion 66 of conductive lead 62 is minimized, such that exposed portion 66 of conductive lead 62 can be manipulated by the human eye and the human finger or finger nail, such that water can complete a circuit between hook end portion 22 and the exposed portion 66 of conductive lead 62, and such that air cannot complete a circuit between hook end portion 22 and the exposed portion 66 of conductive lead 62. Hook 12 including adhesive or conductive connection 44, electrical lead 60, and electrical lead 54 including adhesive or conductive connection 58, can be referred to as a lead arrangement or an electrical lead arrangement.

Light source structure 16 is positioned proximate the tip 28 and barb 30 of hook 12. Light source structure 16 is positioned to confront the intermediate portion 32 of hook 12. Light source structure is positioned to further confront the second end portion 26 of the hook 12. Light source structure is positioned to further confront the tip 28 and barb 30 of hook 12. Light source structure 16 is positioned generally between battery 14 and the tip 28 and barb 30. In such a position, light source structure 16 is adjacent the tip 28 and barb 30 so as to maximize chances that the tip 28 and barb 30 catch a fish attracted to the light source of light source structure 16.

Light source structure 16 can be potted inside or outside of plastic sphere or ball portion 46. Light source structure 16 can be potted in a stem portion 68 of plastic body 20.

Plastic body 20 includes the ball portion 46 and the stem portion 68. Ball portion 46 and stem portion 68 are one-piece and integral with each other. Ball portion 46 and stem portion 68, and the plastic body 20 as a whole, are formed at the same time from the same plastic or resin. Ball portion 46 is preferably spherical or generally spherical. Stem portion 68 includes a cylindrical section 72 engaging ball portion 46 and a frustoconical or tapering section 74 leading away from the ball portion 46 and cylindrical section 72 and leading toward the second end 26 of hook 12 along hook 12.

Power source 14 is entirely contained or potted within ball portion 46. A housing 70 (from which light is emitted) of light source structure 16 is entirely contained or potted within stem portion 68. Electrical lead 54 and adhesive connection 58 are entirely contained or potted within plastic body 20, with a portion of electrical lead 54 potted within stem portion 68 and a portion of electrical lead 54 potted within ball portion 46. Electrical lead 60, except for generally exposed portion 66, is entirely contained or potted within plastic body 20, with a portion of electrical lead 60 potted within stem portion 68 and a portion of electrical lead 60 potted within ball portion 46. Hook 12 is partially contained or potted within plastic body 20, with stem portion 68 containing or potting a length of the second generally linearly extending section 36 of hook 12, with ball portion 46 containing or potting a length of the second generally linearly extending section 36 of hook 12 including adhesive connection 44, and with ball portion 46 containing or potting a length of the first generally linearly extending section 34 of hook 12.

Plastic body 20 is preferably clear (transparent) or relatively clear. Plastic body 20 may be translucent. Plastic body 20 is preferably not opaque.

It should be noted that electrical lead or circuit arrangement 18 can include hook 12, battery 14, LED 16, electrical leads 54, 60, 62 and other electrical leads, connection 44, connection 58, eyelet 24, exposed portion 66, and other electronic components, and can further include transistors, resistors, capacitors and integrated circuits.

In operation, fishing jig 10 is engaged to a fishing line via eyelet 24. Fishing jig 10 is then immersed in a body of water. Upon immersion, an electrical circuit is completed between exposed portion 66 and hook end portion 22. Electrical flow can thereupon occur from hook end portion 22, to exposed portion 22, through electrical lead 60, to light source structure 16, to electrical lead 54, to the second face 48 of battery 14, to the first face 42 of battery 14, and back to hook 12 and hook end portion 22. Depending upon the circuitry in the light source structure 16 and/or battery 14 and/or contained or potted within plastic body 20, the light source of the light source structure 16 emits light to attract fish, which then strike the fishing jig 10 at the light in the proximate area of the tip 28 and barb 30 of the hook 12. Upon withdrawal of the fishing jig 10 from the body of water, water falls away from the area between exposed portion 66 and hook end portion 22, whereupon the electrical circuit is broken and the light source structure 16 ceases operation, thereby automatically preserving power of the power source 14.

Figure 4A:
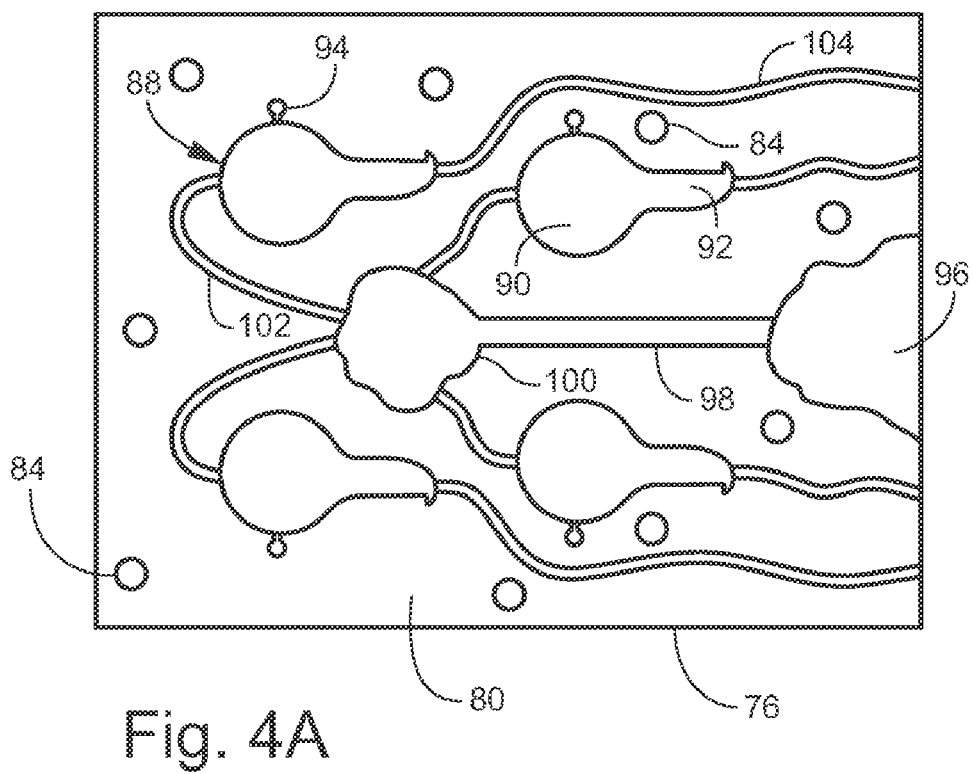
FIG. 4A is a top view of one half section of a mold for manufacturing the present fishing jig.
Figure 4B:
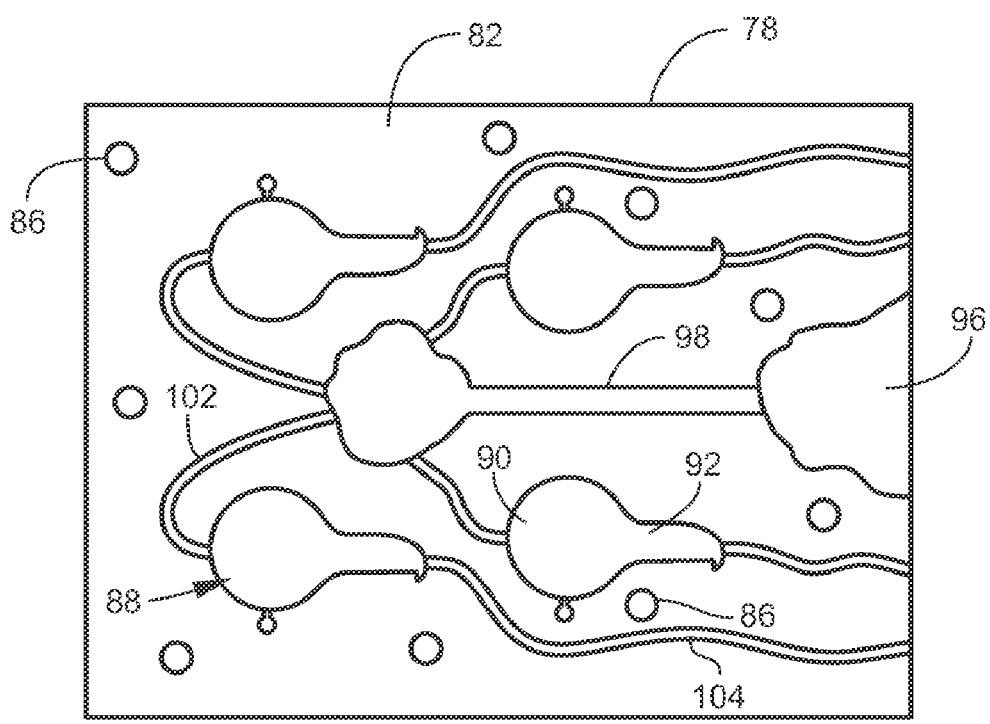
FIG. 4B is a top view of the other half section of the mold of FIG. 4A.

A half section 76 of a potting mold is shown in FIG. 4A and the mating half section 78 of the potting mold is shown in FIG. 4B. A face 80 of mold section 76 confronts and engages a face 82 of mold section 78. Mold section 76 includes a set of nubs 84 that uniquely engage a set of depressions 86 of mold section 78. Each of the mold sections 76, 78 includes a set of cavities 88. Each of the cavities 88 includes a cavity portion 90 for forming about one-half of ball portion 46. Each of the cavities 88 includes a cavity portion 92 for forming about one-half of stem portion 68. Each of the cavities 88 of mold section 76 oppose a respective cavity 88 of mold section 78 when the mold section 76, 78 engage each other via the nubs 84 and depressions 86. Each of the cavities 88 can include an eyelet cavity 94. Mold sections 76, 78 can be formed of silicon or steel.

To make potted fishing jig 10, light source structure 16 is physically and electrically engaged to the second face 48 of battery 14 with the adhesive connection 58. Structure 16 is selected such that electrical lead 54 is preferably relatively rigid so that light source structure 16 maintains a relatively stationary and stable position relative to battery 14 after being engaged via the adhesive connection 58. Hook 12 is then physically and electrically engaged to the first face 42 of battery 14 via adhesive connection 44. Hook 12, preferably formed of a relatively rigid, though bendable or flexible metal such as steel, thus maintains a relatively stationary and stable position relative to the battery 14. Such a prefabricated state or form 11, as shown in FIG. 1, is laid into one cavity 88 of mold half section 76 (or mold half section 78), with the eyelet 24 engaging eyelet cavity 94 and with second end portion 26 of hook 12 laying on face 80 (or face 82). Then second electrical lead 60 is laid on top of first face 42 and oriented such exposed portion 66 is adjacent eyelet 24. (If a cavity 88 is being used where the first face 42 is disposed on top of second electrical lead 60, then exposed portion 66 may be stuck into eyelet 24 or stuck into a receptor in the mold half section to keep the second electrical lead 60 away from a surface of cavity 88 and to maximize chances that electrical lead 60, except for portion 66, is entirely contained within plastic body 20.) Then, with the prefabricated structure 11 generally suspended in cavity 88, the mold sections 76 and 78 are engaged. Then molten plastic is poured into an inlet 96, through main channel 98, into manifold or distributor 100, through second channels 102, into cavities 88 where the molten plastic flows over and around the prefabricated structure shown in FIG. 1. Excess molten plastic or fluid or gaseous emissions can flow out of the mold via third channels 104. Then, after the molten plastic has cooled, the mold sections 76, 78 are removed from each other, and a set of four fishing jigs 10 can be removed with a minimum of trimming or buffing.

The plastic of the plastic body 20 preferably includes a thermoset plastic or a thermoplastic. Of these, a thermoset plastic is preferred. The present fishing jig 10, in its finished form, includes plastic sections of various thickness, and thermoset plastics are preferred when working with plastic sections of various thicknesses as found in fishing jig 10.

The plastic of the plastic body 20 can include a polyurethane or epoxy based polyurethane.

Figure 5A:
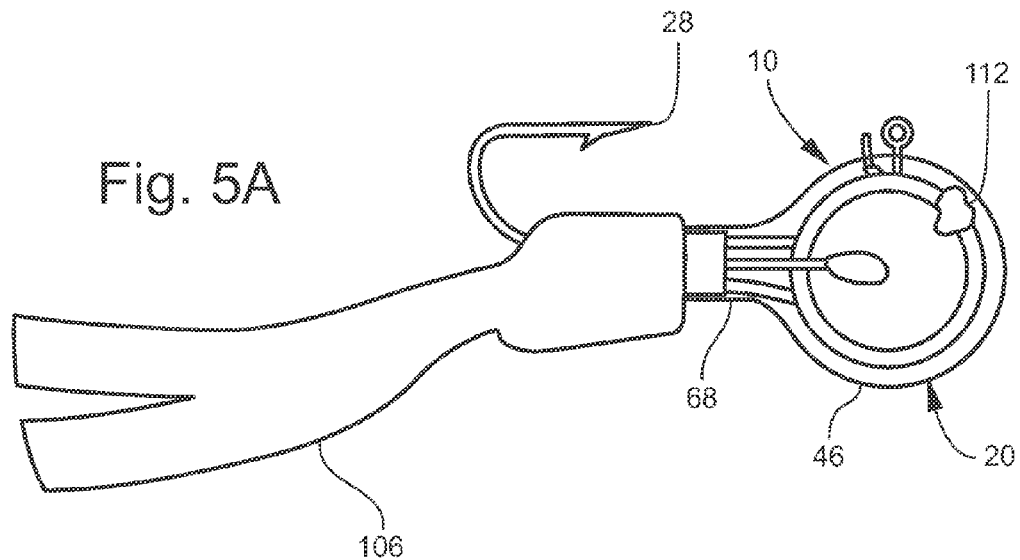
FIG. 5A is a side view of the fishing jig of FIG. 2B having a portion resembling a tail of a fish.
Figure 5B:
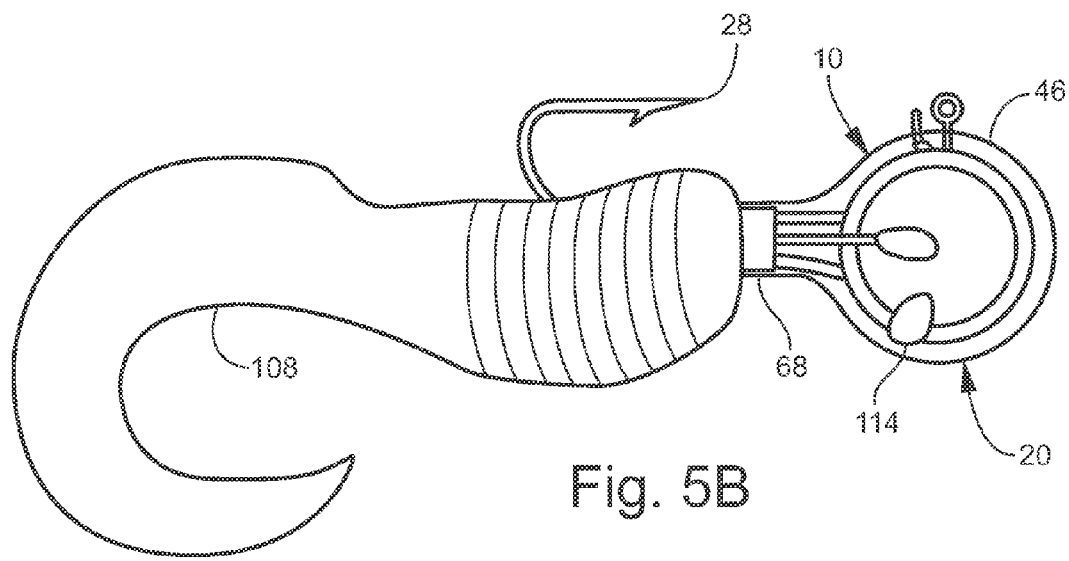
FIG. 5B is a side of the fishing jig of FIG. 2B having a portion resembling a leech.

FIG. 5A shows fishing jig 10 engaging a flexible plastic bait piece 106 resembling a tail of a fish. FIG. 5B shows fishing jig 10 engaging a flexible plastic bait piece 108 resembling a leech. Each of the pieces 106, 108 can circumferentially engage stem portion 68 via a tubular resilient portion 110. Tip 28 can be inserted into tubular portion 110, poked (pierced) through portion 110, and tubular portion 110 can be stretched about stem portion 68 to engage piece 106 (or piece 108) to its respective fishing jig 10.

It should be noted that the fishing jig 10 (or the stick-on potted strip 216), particularly the exterior surface of the plastic body 20 or a portion of the exterior surface of the plastic body 20, can be painted with luminescent paint 112 (shown in FIG. 5A) and/or with fluorescent paint 114 (shown in FIG. 5B) or with some other kind of light reflective or emitting paint. Luminescent paint includes paint that emits light after being exposed to incandescent light. Fluorescent paint includes paint that emits light after being exposed to ultraviolet light. Such paint, whether luminescent or fluorescent, can be of different colors. The ball portion 46 can be painted, leaving the stem portion 68 unpainted.

It should be noted that the light source structure 16 can be entirely contained in ball portion 46 such that stem portion 68 can be eliminated from fishing jig 10. For example, housing 70 can be disposed to abut or almost abut the rim of battery 14, as shown by fishing jig 116 in FIG. 6A. Or housing 70 can be disposed in one spherical half portion of ball portion 46 and the battery 14 can be disposed in the other spherical half portion of ball portion 46, as shown by fishing jig 118 in FIG. 6B. Or a ball portion 46 can contain two light source structures 16, one in each spherical half portion with the battery 14 intermediate the light source structures 16, as shown by fishing jig 118 in FIG. 6B. The plastic of the ball portion 46 of fishing jigs 116, 118 can disperse or magnify the light from the light source structure 16 thereby turning a light source such as an LED from a relatively small almost dimensionless light into a light having the appearance of three dimensions, having the appearance of greater volume, and even having the appearance of being brighter. Transparent (clear or substantially clear) plastic or translucent plastic can be used for the ball portion 46 of fishing jigs 116, 118.

Ball portion 46 is preferably formed in the shape of a sphere or in the shape of a general sphere. Ball portion 46 can be formed in a shape that is not the shape of a ball. For example, portion 46 can be formed in the shape of a cube or parallelepiped (box-like) structure. Or portion 46 can be shaped in an irregular shape. Or portion 46 can be conical or frustoconical. Or portion 46 can be a generally flat and relatively thin structure.

It should be noted that with a watch, coin cell or button battery, the life of such battery may be a year or two (such as when the battery is in a watch and is continuously supplying power). With the present fishing jig 10, the fishing jig 10 is not continuously immersed in water, is not continuously on and hence is not continuously draining battery 14 of power. The life of fishing jig 10 is thus generally the same as the life of a given unused battery minus the time the particular fishing jig 10 is immersed in a body of water.

It should be noted that with the potting of the fishing jig 10, components of the fishing jig 10, including battery 14, are sealed therein. Potential for leakage, such as chemicals from battery 14, is thereby minimized. Fluid leakage out of the plastic body 20 is minimized. Fluid flow or seepage into the plastic body 20 is minimized.

As between first generally linearly extending section 34 and second generally linearly extending section 36, some angle, such as an acute, right, obtuse, or oblique angle is preferred so as to minimize any spinning of battery 14 relative to hook 12, in the prefabricated form 11 or in the final structure 10. Such angle somewhat cradles or provides a platform for battery 14. However, a generally 90 degree angle is more preferred between sections 34 and 36.

It should be noted that eyelet 24 be set in generally a common plane with barb 30 and with the curved section 38 of the hook 12, or can be perpendicular or oblique to a plane in which the barb 30 and curved section 38 of the hook 12 lie. It is preferred that eyelet 24 be set in generally a common plane with barb 30 and with the curved section 38 of the hook 12.

FIGS. 7 and 8 show an alternate embodiment of the fishing jig 10 shown, for example, in FIGS. 1 and 2. In FIGS. 7 and 8, a fishing jig 120 includes battery 14, LED 16, and plastic body 20. Fishing jig 120 further includes an electrical lead arrangement 122, a circuit board 124, a transistor 126, and a hook 128.

As shown best in FIG. 7, electrical lead arrangement 122 includes an electrical lead 130 having an exposed end portion or moisture contact 132. Electrical lead 130 includes a second end portion 134 electrically and physically engaged (such as via a soldering cement) to one or more of the circuit board 124 and battery face or terminal 42. The main body of electrical lead 130 can be electrically isolated from face or terminal 42 of battery 14 via an electrically insulative jacket.

Electrical lead arrangement 122 further includes an electrical lead 136 having a first end portion 138 and a second end portion 140. First end portion 138 is electrically and physically engaged (such as via a soldering cement) to one of more of circuit board 124 and battery face or terminal 42. Second end portion 140 is electrically and physically engaged (such as via a soldering cement) to light source structure or LED 16. The main body of electrical lead 136 can be electrically isolated from face or terminal 42 of battery 14 via an electrically insulative jacket.

Electrical lead arrangement 122 further includes an electrical lead 142 having a first end portion 144 and a second end portion 146. First end portion 144 is electrically and physically engaged (such as via a soldering cement) to light source structure or LED 16. Second end portion 146 is electrically and adhesively engaged to second face or terminal 48 of battery 14.

Electrical lead arrangement 122 further includes an electrical lead 148 having a first end portion 150 and a second end portion or moisture contact 152. First end portion 150 is electrically and adhesively engaged to second face or terminal 48 of battery 14. Second end portion or moisture contact 152 is an eyelet to which a fishing line can be tied or to which a fishing peripheral such as a fishing lead line can be snapped or otherwise engaged. Electrical lead 148 may be relatively rigid and can be one-piece and integral with moisture contact or eyelet 152. Electrical lead 148 may come under relatively great forces when a fish strikes fishing jig 120 and when a fisherman plays such fish.

Circuit board 124 can be electrically and physically engaged (such as via a soldering cement) to battery face or terminal 42. As indicated above, circuit board 124 can include an integrated circuit for controlling a number of functions, as indicated above, of the fishing jig 10 or the fishing jig 120. These functions can include providing a steady or always on light or LED (when immersed in water), a regularly blinking light (when immersed in water), and an irregularly or randomly blinking LED (when immersed in water). Such functions or integrated circuitry can also include the capability or circuitry to use different colored light emitting diodes including ultraviolet light emitting diodes.

Transistor 126 can be electrically and physically engaged (such as via a soldering cement) to circuit board 124. Transistor 126 can be a transistor of an NPN kind or of a PNP kind, with the PNP kind of transistor being preferred. In relatively cold water, such as water under ice in a lake where the water has a depth of several feet to several hundred feet and where such water can have a temperature as low as of about 32 degrees F., transistors that are more effective as switches are preferred. One such cold water transistor is the PNP kind of transistor. Fishing water temperature may be different depending on, for example, the region of the lake or river or stream, and the time of the year. For example, in January or February in a lake in the state of Alabama, a lake temperature may be run from about 45 degrees F. to about 55 degrees F. However, in Minnesota, under ice, lake temperature can be as low as about 32 degrees F. It should be noted that some transistors, such as some NPN transistors, are ineffective as switches at relatively cold temperatures, such as at temperatures less than room temperature. Even more transistors are ineffective as switches when in environments at less than 50 degrees F. Even further transistors are ineffective as switches when in environments at less than 45 degrees F. An inoperable transistor cannot operate the light source 16 or will operate the transistor so ineffectively that the light source 16 will be extremely dim and unacceptably dim.

Fish can survive, feed, and be active at temperatures as low as about 32 degrees F. Fish, a cold blooded animal, responds to the temperature of the water. For example, rainbow trout spawn in the spring when water temperatures fall in the range from about 41 degrees to about 55 degrees F.

Some types of fish are more active at colder temperatures. For example, some types of fish are more active at about 40 degrees F. than at about 70 degrees F. One way to classify fish is as a warm water species or a cold water species.

Cold water has the capacity to hold a relatively great amount of oxygen. Warm water has the capacity to hold a relatively small amount of oxygen. As a general rule of thumb, electrical apparatus such as transistors tend to operate more efficiently at warmer temperatures and less efficiently at colder temperatures.

Transistor 126 is, by definition, a three terminal semiconductor amplifying device. Transistor 126 can be a bipolar kind of transistor or an FET kind of transistor (a field effect transistor). Among such, the bipolar kind of transistor is preferred.

A bipolar kind of transistor is a kind of transistor made from a sandwich of N-kind and P-kind semiconductor material: either NPN or PNP. Among such, the PNP kind of transistor is preferred.

A PNP kind of bipolar transistor includes a layer of N-doped semiconductor (the base) between two P-doped layers (the collector and emitter). The emitter, base, and collector in the PNP kind of transistor are made of materials that are different from the materials that are used in the NPN kind of transistor such that most of the current carriers in the PNP kind of transistor are holes. A PNP kind of transistor conducts electricity by virtue of electron deficiency. Most of the current carriers in the NPN kind of transistor are electrons. An NPN kind of transistor conducts electricity by virtue of free electrons.

Transistor 126 is effective as a switch when immersed in water having a temperature between about 32 degrees F. and about 100 degrees F. or above. Transistor 126 is effective as a switch when immersed in water having a temperature as low as about 70 degrees F., or as low as about 60 degrees F., or as low as about 55 degrees F., or as low as about 50 degrees F., or as low as about 45 degrees F., or as low as about 40 degrees F., or as low as about 35 degrees F., or as low as about 32 degrees F. Effective means that the light source 16 turns on and further means that the light source 16 reaches and maintains a bright light (a standard level of brightness, or a maximum level of brightness, for the LED or light source that is used) even in muddy dark waters.

Hook 128 can be a complete hook. That is, hook 128 can include tip 38, barb 30, curved section 38, intermediate section 32, and eyelet 152. Intermediate section 32 can include the first generally linearly extending section 34 where such section 34 is electrical lead 148 and where such lead 148 is one-piece with eyelet 152 such that hook 128 is one-piece with lead 148 and eyelet 152. Hook 128 further can include the second generally linearly extending section 36. If desired, hook 128 can be of a two-piece kind, as shown in FIG. 8, where a first piece is fixed by the ball portion 46 of the plastic body 20 and where a second piece is fixed by the stem portion 68 of the plastic body 20. Such first piece includes the first generally linearly extending section 34 including the eyelet 152. Such second piece includes a length of the second generally linearly extending section 36, hook section 38, barb 30 and tip 28. In FIG. 8, stem 68 can include a reinforcing collar 154, formed of a metal, plastic or composite material, where collar 154 can minimize a splitting of stem 68.

Figure 9:
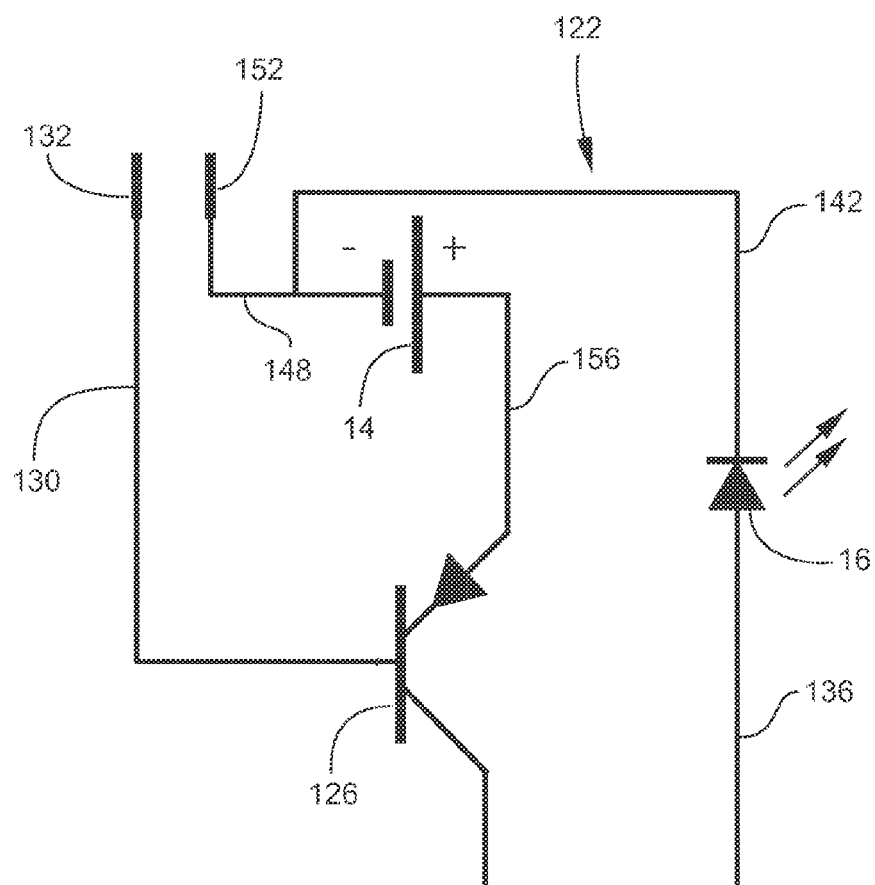
FIG. 9 shows a circuit diagram for the fishing jig embodiment of FIGS. 7 and 8.

FIG. 9 shows the electrical lead arrangement 122 including battery 14, light source structure 16, transistor 126, moisture contacts 132, 152, and electrical leads 130, 136, 142 and 148. Electrical lead arrangement 122 further includes an electrical lead 156 between battery face or terminal 42 of battery 14 and transistor 126.

It should be noted that the internal components (or hardware) of fishing jig 120 of FIG. 8 are shown in phantom. However, plastic body 20 of fishing jig 120 is preferably relatively clear and transparent such that the internal components can be readily seen with the naked eye through the plastic body 20. If desired, plastic body 20 can be translucent.

It should be noted that plastic to be poured into the closed mold formed by mold sections 76 and 78 can be a polyurethane thermoset, such as IE 100 Polyurethane available from Innovative Polymers, Inc. of St. Johns, Mich. It should be noted that clear plastics are preferred and that a clear plastic body 20 can be obtained with a polyurethane or polycarbonate.

It should be noted that weights may be molded (potted) within plastic body 20 so as to increase the weight (mass) of the present fishing jig. Such weights may be small pieces of a relatively dense material such as a metal. The metal may be lead (Pb) or a non-toxic metal such as steel. The shape of such weights may be of any shape, such as a ball shape or cylindrical shape or rod shape. Lead weight 244 is shown in jig 118 of FIG. 6B.

Figure 10:
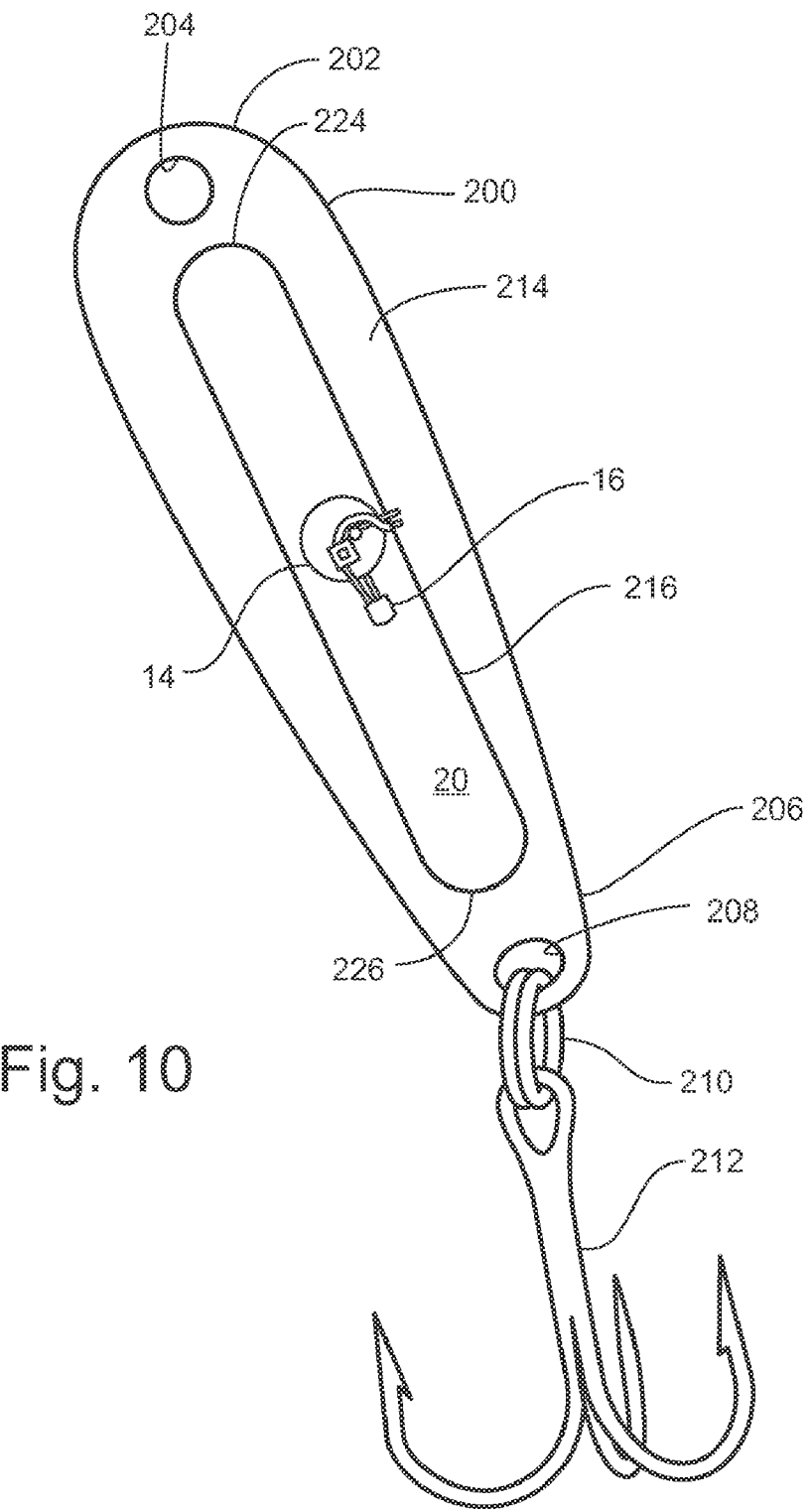
FIG. 10 is a front view of an alternate embodiment of the invention where such embodiment is a stick-on potted strip that can be stuck on a fishing lure such as the spoon shown in FIG. 10, where the stick-on potted strip includes an internal light that is water-activated.

FIG. 10 shows a fishing lure or spoon 200. Spoon 200 includes a first end 202 having an eyelet 204 for attachment to a fishing line. Spoon 200 further includes a second end 206 having an eyelet 208 that engages a ring 210 that in turn engages a tripartite hook 212. Spoon 200 further includes a surface 214 that is typically curved.

As shown in FIG. 10, the stick-on potted strip 216 is fixed to the surface 214 of the spoon 200. As with fishing jig 10 (or jig 116, 118 or 120), and as shown in FIG. 11A and 11B, stick-on potted strip 216 includes the power source 14, the light source structure or light emitting diode (LED) 16, the electrical lead or circuit arrangement 18, and the plastic body 20 (with the plastic body being formed in a different shape than plastic body 20 shown in FIG. 2A). The electrical lead or circuit arrangement 18 includes circuit board 124 and transistor 126. The electrical lead or circuit arrangement 18 further includes electrical lead 54 running from one face of power source or battery 14 to the LED 16. The electrical lead or circuit arrangement 18 further includes electrical lead 60 running from LED 16 to circuit board 124 having transistor 126, to which it makes an electrical connection, and from circuit board 124 to exit the plastic body 20 at exposed portion 66. Exposed portion 66 and an exposed portion 218 of wire 22 act as a switch, closing circuit arrangement 18 when body 20 is submersed in water. Wire 22 is physically and electrically engaged to the other face of the battery 14.

The mechanical and electrical arrangement of hardware with the potted body 20 of the stick-on potted strip 216 is entirely disposed within body 20 except for exposed portions 66 and 218. That is, at least the following elements are within body 20: battery 14, LED 16, electrical lead or circuit arrangement 18, lead 54, lead 60, circuit board 124, transistor 126 and wire 22. As with jig 10, preferably no voids are contained within plastic 20 such that body 20 is solid plastic over three dimensions, i.e., from side to side, from top to bottom, and from front to back and such that plastic of the plastic body 20 is solid up to the surfaces of the hardware contained within the plastic body 20. It is noted that an LED may, as fabricated, contain a void or empty space and that transistor 126 may contain voids or empty spaces.

Plastic body 20 of stick-on potted strip 216 includes an upper surface 220, a lower surface 222, a first end 224, a second end 226, a first side 228 and a second side 230. Stick-on plastic strip 216 further includes an adhesive 232 on lower surface 222 and running from the first end 224 to the second end 226 and from the first side 228 to the second side 230. A release strip 234 entirely covers the adhesive 232 such that, when release strip 234 is removed, adhesive 232 is in condition for adhering to a face of a fishing lure, such as face or surface 214 of spoon 200.

If desired, lower surface 222 of body 20 of stick-on potted strip 216 can be slightly curved from first end 224 to second end 226 and/or from first side 228 to second side 230 because surfaces of fishing lures are often curved.

Preferably, the plastic of plastic body 20 of stick-on potted strip 216 is relatively flexible such that, even if lower surface 222 is not curved, the lower surface 222 can flex to attain the surface curvature of the fishing lure to which it is stuck. Preferably, the plastic of plastic body 20 of jig 10 (or jig 116, 118 or 120) is relatively rigid.

One method for making strip-on potted strip 216 uses the step of suspending or holding the hardware (battery 14, LED 16, circuit arrangement 18, etc.) in a space via the exposed portions 66, 218. Then liquid plastic can be poured into the space and permitted to harden with or without catalysts or hardeners.

The hardware of the stick-on potted strip 216 can be potted generally midway between the first and second ends 224, 226. Or the hardware of the stick-on potted strip 216 can be potted such that the hardware confronts the first end 224. Or the hardware of the stick-on potted strip 216 can be potted such that the hardware confronts the second end 226 such that the LED 16 confronts the hook 212 so as to maximize the chances that a fish, attracted to the LED 16, strikes the spoon 200 adjacent hook 212.

The shape of the body 20 of the stick-on potted strip 216 is elongate. However, the shape of body 20 may be in the form of a disk, or a square, or a rectangle, or crescent, or some other shape.

It should be noted that, instead of a circuit board 124 in jig 10 (or jig 116, 118 or 120) and stick-on potted strip 216, some type of processor or microprocessor can be in the electrical lead or circuit arrangement 18.

Figure 2A:
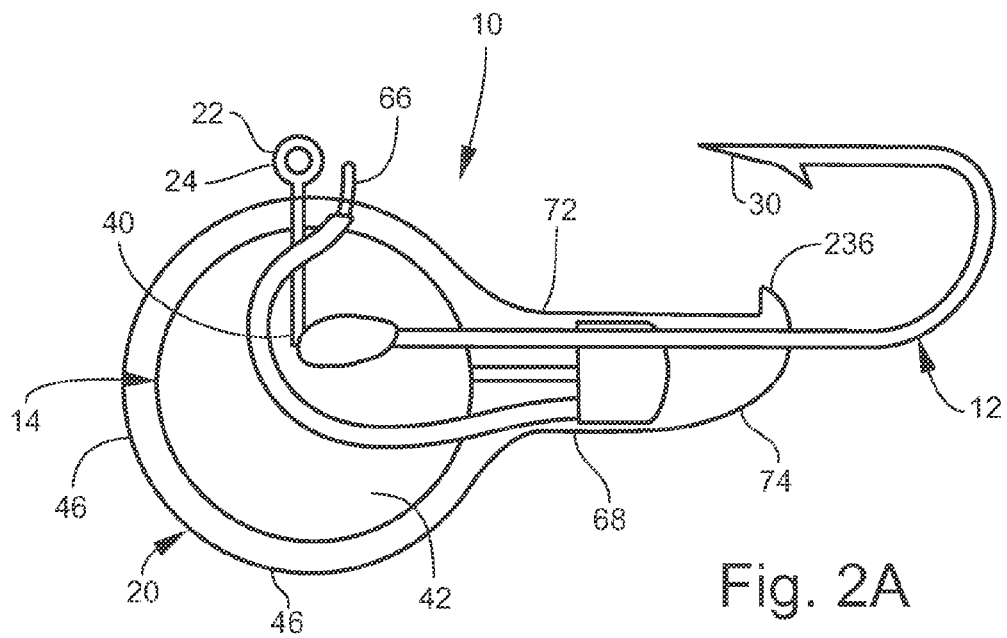
FIG. 2A is a side view of the fishing jig of FIG. 1 with the plastic body that pots or partially pots components of the fishing jig.
Figure 2B:
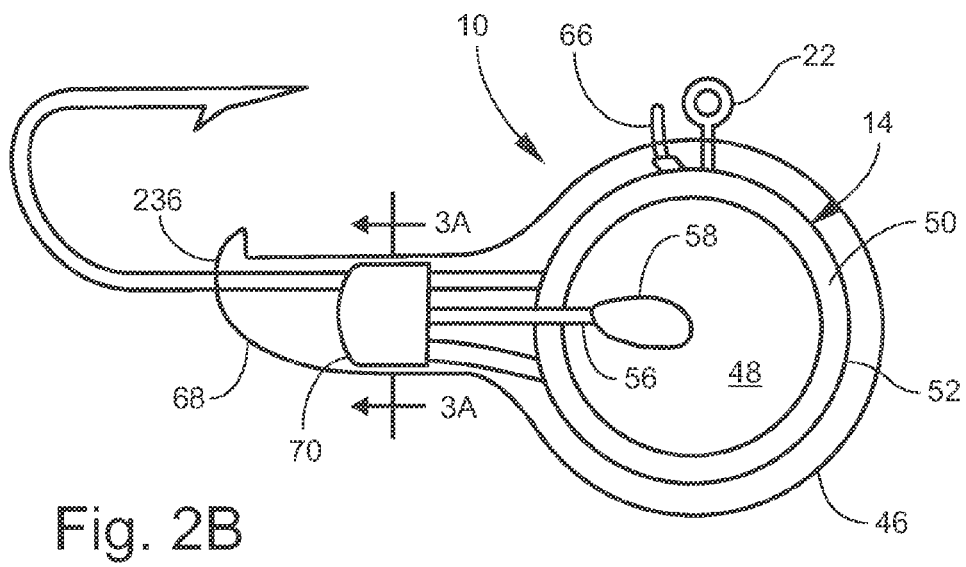
FIG. 2B is a side view, opposite of the side view of FIG. 2A, of the fishing jig of FIG. 1 with the plastic body that pots or partially pots components of the fishing jig.

As illustrated in FIGS. 2A and 2B, the plastic body of jig 10 can include a prong or barb or projection 236 to maximize engagement of a plastic bait such as plastic bait 106 or 108. The barb 236 is one-piece and integral with the body 20.

Figure 6A:
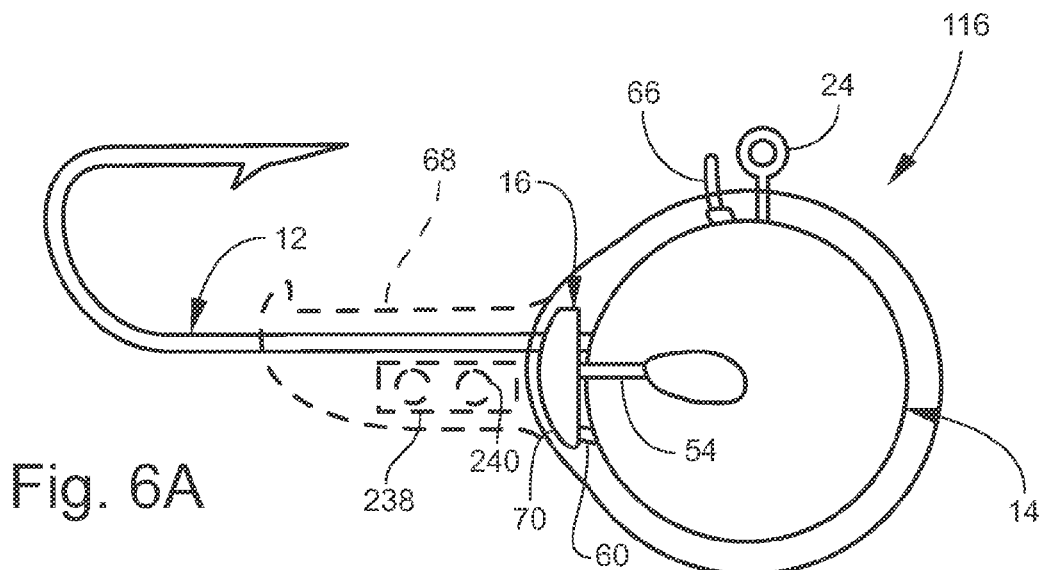
FIG. 6A is a side view of an alternate embodiment of the present fishing jig.

It should be noted that, as illustrated in FIG. 6A, a "BB" tube 238 having metal or plastic balls 240 (or "BBs" 240) contained therein may be potted in the stem portion 68, particularly when LED 16 is potted within the ball portion 46 of plastic body 20. When jig 10 (or jig 116, 118 or 120) is raised and lowered, balls 240 move back and forth within tube 238 so as to generate a rattling sound, thereby attracting fish. Tube 238 and balls 240 can also be placed in the stick-on potted strip 216.

Figure 6B:
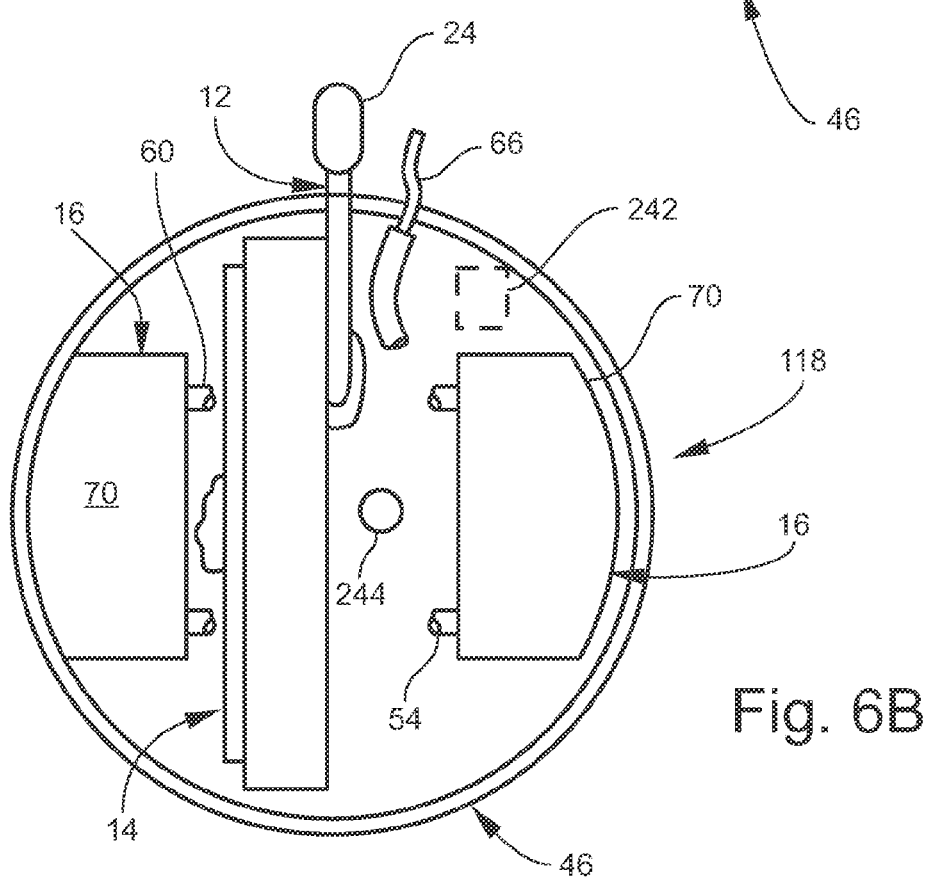
FIG. 6B is an end view of an alternate embodiment of the present fishing jig.

As illustrated in FIG. 6B, jig 10 (or jig 116, 118 or 120) or stick-on potted strip 216 can include an electrically powered eccentric cam or tuning fork or other vibration producing apparatus 242 so as to vibrate plastic body 20, thereby attracting fish. Eccentric cam or apparatus 242 can be electrically engaged to the battery 14.

As with jig 10 (or jig 116, 118 or 120), stick-on potted strip 216 can have a luminescent coating 112 and/or fluorescent coating 114, as shown in FIG. 11A.

As with jig 10 (or jig 116, 118 or 120), stick-on potted strip 216 can be formed of plastic of different colors. As with jig 10 (or jig 116, 118 or 120), such plastic can include luminescent and/or fluorescent elements or components such that the plastic itself "glows."

The present jig 10, 116, 118 or 120, or the stick-on potted strip 216, can be fabricated by reactive injection molding.

The present jig 10, 116, 118 or 120, or the stick-on potted strip 216, can be fabricated by a process that includes the steps of a) opening a mold, b) then injecting a small amount of a mixture of a polyurethane material (or other polymer material), a mold release agent, a coloring agent and a catalyst into the mold cavities of both portions of the mold so that the polymer material may adhere to the whole surface of the wall of the cavity and form the surface portion of the final product (i.e., the jig 10, 116, 118 or 120 or stick-on potted strip 216), c) then allowing the polymer material to at least partially cure or harden, d) then laying the internal components or hardware (including the battery 14, LED 16, circuit arrangement 18) into a cavity so as to be isolated from the wall of the cavity except for the exposed portions of the circuit arrangement 18 which can be engaged in slots formed in the wall cavity, e) then closing the mold, f) then injecting another polyurethane material (or other polymer material) into the cavity to form an inner portion of the final product, g) then opening the mold, and h) then removing the final product. As to such a process and as to reactive injection molding, the Tachi et al. U.S. Pat. No. 5,962,142 issued Oct. 5, 1999 and entitled Two-colored Molded Product Of Polyurethanes Made By RIM And Process For Manufacturing The Same is hereby incorporated by reference.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A fishing jig, comprising:
 a) a plastic body;
 b) a hook having two end portions and an intermediate portion, with one of the end portions comprising a barb, with at least a section of the intermediate portion being potted in said plastic body;
 c) a battery potted in said plastic body;
 d) a light source structure potted in said plastic body and comprising a light source;
 e) an electrical lead arrangement at least partially potted in said plastic body and electrically engaged to the battery and light source structure, with at least one of the electrical lead arrangement and hook having exposed portions, with said exposed portions extending out of the plastic body such that, when water is present between said exposed portions, a circuit is completed between the battery and light source structure such that the light source of the light source structure can emit light; and
 f) wherein hardware of the fishing jig comprises the battery, the light source structure, and the electrical lead arrangement, with the plastic body being over and around and solid up to the surfaces of the hardware such that the plastic body is solid over three dimensions from end to end, from side to side, and from front to back, such that plastic of the plastic body includes no voids, with the plastic body being one-piece and integral.

2. The fishing jig of claim 1, wherein the fishing jig is a single hook fishing jig having no more than one hook.

3. The fishing jig of claim 1, wherein the light source structure confronts the barb of the hook such that chances are maximized that a fish striking at the light source of the light source structure also strikes the barb.

4. The fishing jig of claim 1, wherein the light source structure is generally disposed between the battery and the barb so as to position the light source structure relatively close to the barb.

5. The fishing jig of claim 1, wherein the light source structure confronts the intermediate portion of the hook such that the light source is proximate the barb of the hook.

6. The fishing jig of claim 1, wherein the electrical lead arrangement includes one of the exposed portions and wherein the hook includes the other of the exposed portions.

7. The fishing jig of claim 1, wherein the hook is generally directly engaged to one terminal of said battery.

8. The fishing jig of claim 1, wherein the intermediate portion of the hook includes a first section and a second section, with the first and second sections being disposed at an angle to each other, with each of the first and second sections confronting a face of the battery.

9. The fishing jig of claim 1, with one of the exposed portions extending generally directly from the light source structure.

10. The fishing jig of claim 1, wherein the plastic body includes a generally spherical portion, with the battery being potted in the generally spherical portion.

11. The fishing jig of claim 1, wherein the plastic body includes a stem portion, with the light source structure being potted in the stem portion.

12. The fishing jig of claim 1, wherein the end portion of the hook having the barb includes a curved section, with the curved section being disposed in generally a first plane, wherein the battery includes a face engaged to the hook, and wherein said face of the battery lies in a second plane parallel to and confronting the first plane, such that the fishing jig takes up a minimum of space.

13. The fishing jig of claim 1, wherein the plastic body is one of a transparent and translucent plastic such that the light source structure can be potted deeply into the plastic body and still be visible from an exterior of the plastic body even in dark waters and such that a low voltage light source structure can be selected to extend battery life.

14. A fishing jig, comprising:
 a) a plastic body;
 b) a hook having two end portions and an intermediate portion, with one of the end portions comprising a barb, with the other of the end portions comprising an eyelet, and with the intermediate portion being at least partially potted in said plastic body;
 c) a battery potted in said plastic body;
 d a light source structure potted in said plastic body;

e) an electrical lead arrangement patted in said plastic body and electrically engaged to the battery and light source structure;

f) wherein the light source structure confronts the intermediate portion of the hook, wherein the light source structure further confronts the end portion of the hook having the barb, and wherein the light source structure further confronts the barb such that chances are maximized that a fish striking at a light source of the light source structure also strikes the barb; and g) wherein hardware of the fishing jig comprises the battery, the light source structure, and the electrical lead arrangement, with the plastic body being over and around and solid up to the surfaces of the hardware such that the plastic body is solid over three dimensions from end to end, from side to side, and from front to back, such that plastic of the plastic body includes no voids, with the plastic body being one-piece and integral.

15. The fishing jig of claim 14, wherein the fishing jig is a single hook fishing jig having no more than one hook.

16. A fishing jig, comprising:
a) a plastic body, wherein the plastic body is one of a transparent and translucent plastic;
b) a single hook such that the fishing jig is a single hook fishing jig having no more than one hook, with the single hook having two end portions and an intermediate portion, with one of the end portions comprising a barb, with the other of the end portions comprising an eyelet, with the intermediate portion being at least partially potted in said plastic body;
c) a battery potted in said plastic body;
d) a light source structure potted in said plastic body, with the light source structure comprising a light source;
e) an electrical lead arrangement potted in said plastic body and electrically engaged to the battery and light source structure with at least one of the electrical lead arrangement and hook having exposed portions, with said exposed portions extending out of the plastic body such that, when water is present between said exposed portions, a circuit is completed between the battery and light source structure such that the light source of the light source structure can emit light;
f) wherein the light source confronts the intermediate portion of the hook, wherein the light source structure further confronts the end portion of the single hook having the barb, and wherein the light source structure still further confronts the barb such that chances are maximized that a fish striking at the light source of the light source structure also strikes the barb; and
g) wherein hardware of the fishing jig comprises the battery, the light source structure, and the electrical lead arrangement, with the plastic body being over and around and solid up to the surfaces of the hardware such that the plastic body is solid over three dimensions from end to end, from side to side, and from front to back, such that plastic of the plastic body includes no voids, with the plastic body being one-piece and integral.

17. A fishing implement, comprising:
a) a plastic body;
b) hardware in the plastic body, with the hardware including a battery in said plastic body; a light source structure in said plastic body; and an electrical lead arrangement at least partially in said plastic body and electrically engaged to the battery and light source structure, with the electrical lead arrangement having exposed portions, with said exposed portions being out of the plastic body such that, when water is present between said exposed portions, a circuit is completed between the battery and light source structure such that a light source of the light source structure can emit light; and
c) with the plastic body being over and around and solid up to the surfaces of the hardware such that the plastic body is solid over three dimensions from end to end, from side to side, and from front to back, such that plastic of the plastic body includes no voids, with the plastic body being one-piece and integral.

18. The fishing implement according to claim 17, wherein the fishing implement is a fishing lure having a hook.

19. The fishing implement according to claim 18, wherein the fishing lure is a fishing jig.

20. The fishing implement according to claim 17, wherein the battery is potted within said plastic body, wherein the light source structure is potted within said plastic body, and wherein the electrical lead arrangement is at least partially potted within said plastic body.

21. The fishing implement according to claim 17, wherein said plastic body is a molded plastic body.

22. The fishing implement according to claim 17, wherein the fishing implement is a fishing jig, wherein the fishing jig has no more than a single hook section, and wherein the light source structure confronts a barb of the hook section such that chances are maximized that a fish striking at the light source of the light source structure also strikes the barb of the hook section.

23. The fishing implement according to claim 17, wherein the fishing implement is a fishing jig, wherein the fishing jig has no more than a single hook section, wherein the light source structure is generally disposed between the battery and a barb of the hook section so as to position the light source structure relatively close to the barb of the hook section, and wherein the light source structure is further between said exposed portion and the barb of the hook section.

24. The fishing implement according to claim 17, wherein the fishing implement is a fishing jig, wherein the fishing jig has no more than a single hook section, and wherein the plastic body includes a generally spherical portion, with the battery being in the generally spherical portion.

25. The fishing implement according to claim 17, wherein the fishing implement is a fishing jig, wherein the fishing jig has no more than a single hook section, and wherein the plastic of the plastic body is a thermoplastic.

26. A fishing implement, comprising:
a) a plastic body;
b) hardware in the plastic body, with the hardware including a battery in said plastic body; a light source structure in said plastic body; and an electrical lead arrangement at least partially in said plastic body and electrically engaged to the battery and light source structure, with the electrical lead arrangement having exposed portions, with said exposed portions being out of the plastic body such that, when water is present between said exposed portions, a circuit is completed between the battery and light source structure such that a light source of the light source structure can emit light;
c) with the plastic body being over and around and solid up to the surfaces of the hardware such that the plastic body is solid over three dimensions from end to end, from side to side, and from front to back, such that plastic of the plastic body includes no voids, with the plastic body being one-piece and integral;
d) wherein the fishing implement is a fishing jig;
e) wherein the fishing jig has no more than a single hook section;

f) wherein the light source structure confronts a barb of the hook section such that chances are maximized that a fish striking at the light source of the light source structure also strikes the barb of the hook section;
g) wherein the light source structure is generally disposed between the battery and a barb of the hook section so as to position the light source structure relatively close to the barb of the hook section, and wherein the light source structure is further between said exposed portion and the barb of the hook section; and
h) wherein the plastic body includes a generally spherical portion, with the battery being in the generally spherical portion.

27. The fishing implement according to claim 26, wherein the plastic of the plastic body is a thermoplastic.

* * * * *